United States Patent
Jiang

(10) Patent No.: US 9,110,951 B2
(45) Date of Patent: Aug. 18, 2015

(54) METHOD AND APPARATUS FOR ISOLATING A FAULT IN A CONTROLLER AREA NETWORK

(71) Applicant: GM GLOBAL TECHNOLOGY OPERATIONS LLC, Detroit, MI (US)

(72) Inventor: Shengbing Jiang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 157 days.

(21) Appl. No.: 14/027,549

(22) Filed: Sep. 16, 2013

(65) Prior Publication Data

US 2015/0082089 A1    Mar. 19, 2015

(51) Int. Cl.
| | |
|---|---|
| G06F 11/00 | (2006.01) |
| G06F 11/30 | (2006.01) |
| G06F 11/07 | (2006.01) |
| G06F 11/22 | (2006.01) |

(52) U.S. Cl.
CPC ........ *G06F 11/3048* (2013.01); *G06F 11/0706* (2013.01); *G06F 11/0709* (2013.01); *G06F 11/2205* (2013.01); *G06F 11/3003* (2013.01); *G06F 11/3006* (2013.01)

(58) Field of Classification Search
CPC ............ G06F 11/0706; G06F 11/0609; G06F 11/2205; G06F 11/3003; G06F 11/3006; G06F 11/3048
See application file for complete search history.

(56) References Cited

U.S. PATENT DOCUMENTS

| | | | |
|---|---|---|---|
| 7,812,617 B2 | 10/2010 | Hofman | |
| 8,213,321 B2 | 7/2012 | Butts et al. | |
| 2011/0188371 A1 | 8/2011 | Brunnberg et al. | |
| 2012/0158240 A1 | 6/2012 | Downs, Jr. et al. | |
| 2015/0082089 A1* | 3/2015 | Jiang ............................... | 714/25 |
| 2015/0082096 A1* | 3/2015 | Jiang et al. ...................... | 714/37 |

OTHER PUBLICATIONS

U.S. Appl. No. 13/686,361, Jiang, et al.

* cited by examiner

*Primary Examiner* — Joshua P Lottich

(57) ABSTRACT

A controller area network (CAN) on a mobile system has a plurality of CAN elements including a communication bus and nodes. A method for monitoring the CAN includes detecting inactive nodes of the CAN and employing an off-board controller to identify a candidate fault in the CAN based upon the inactive nodes of the CAN and a network topology for the CAN. A fault is isolated in the CAN based upon the candidate fault.

19 Claims, 3 Drawing Sheets

METHOD AND APPARATUS FOR ISOLATING A FAULT IN A CONTROLLER AREA NETWORK

TECHNICAL FIELD

This disclosure is related to communications in controller area networks, and fault isolation associated therewith.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Topology of a network such as a CAN refers to a connective arrangement between network elements, and preferably includes a plurality of nodes having interconnected or dispersed power, ground or communications links therebetween. A physical topology describes arrangement or layout of physical elements including links and nodes, wherein nodes include controllers and other connected devices and links include either power, ground or communications lines. A logical topology describes flow of data messages or power within a network between nodes employing links. Known CAN systems employ a bus topology for the communication connection among all the controllers that can include a linear topology, a star topology, or a combination of star and linear topologies. Known high-speed CAN systems employ linear topology, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus.

Known systems detect faults at a message-receiving controller, with fault detection accomplished for the message using signal supervision and signal time-out monitoring at an interaction layer of the controller. Faults can be reported as a loss of communications, e.g., a loss of a communicated data message. Such detection systems generally are unable to identify a root cause of a fault, and are unable to distinguish transient and intermittent faults. One known system requires separate monitoring hardware and dimensional details of a physical topology of a network to effectively monitor and detect communications faults in the network.

SUMMARY

A controller area network (CAN) on a mobile system has a plurality of CAN elements including a communication bus and nodes. A method for monitoring the CAN includes detecting inactive nodes of the CAN and employing an off-board controller to identify a candidate fault in the CAN based upon the inactive nodes of the CAN and a network topology for the CAN. A fault is isolated in the CAN based upon the candidate fault.

BRIEF DESCRIPTION OF THE DRAWINGS

One or more embodiments will now be described, by way of example, with reference to the accompanying drawings, in which.

DETAILED DESCRIPTION

Figure 1:
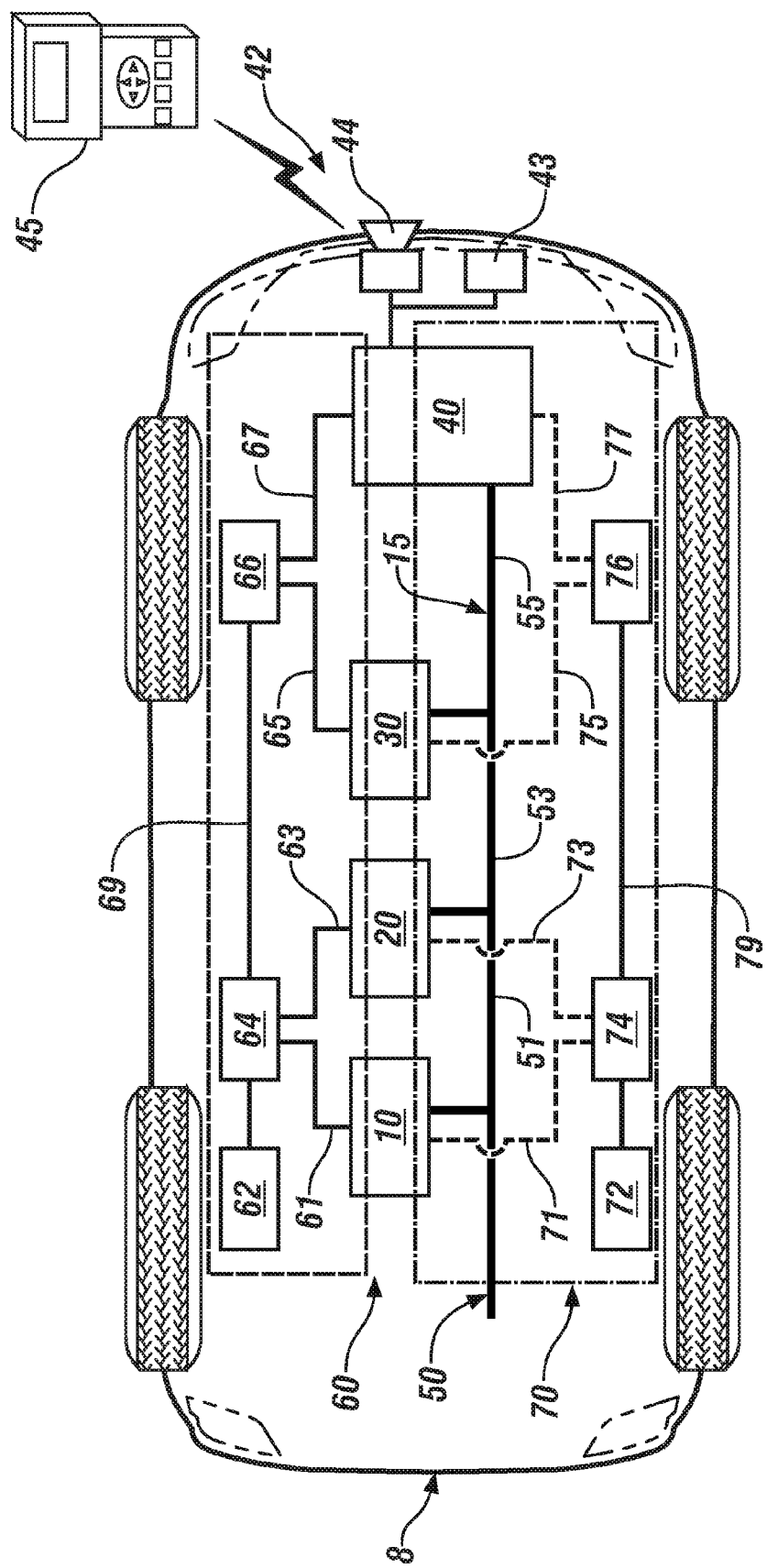
FIG. 1 illustrates a mobile vehicle including a controller area network (CAN) including a CAN bus and a plurality of nodes, e.g., controllers, and an off-board device, in accordance with the disclosure.

Referring now to the drawings, wherein the showings are for the purpose of illustrating certain exemplary embodiments only and not for the purpose of limiting the same, FIG. 1 schematically illustrates a mobile vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, and/or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device that is configured to monitor or control operation of a subsystem of the vehicle 8 and communicate via the CAN bus 15. In one embodiment, one of the controllers, e.g., controller 40, is configured to monitor the CAN 50 and the CAN bus 15, and may be referred to herein as a CAN controller. Controller 40 signally connects to a communications device 42 that is configured to communicate a digital message to an off-board device 45 employing a direct hard-wire connection 43 and/or a wireless telematics connection 44. The direct hard-wire connection 43 and the wireless telematics connection 44 employ any suitable communications protocol(s).

The illustrated embodiment of the CAN 50 is a non-limiting example of a CAN that may be employed in any of a plurality of system configurations. Each CAN is described employing a network topology that includes a physical arrangement of power, ground, and communication links between the nodes including controllers and other electronic devices. A network topology such as a CAN refers to a connective arrangement between network elements, and preferably includes a plurality of nodes having interconnected or dispersed power, ground or communications links therebetween. Topology graphs are developed, including a communications topology, a power topology and a ground topology. The network topology relates to signal, power and ground connectivity between the nodes and other elements, e.g., power and ground sources, and physical or linear distances between nodes, physical interconnections, transmission rates, and/or signal types are secondary considerations. Thus, a common network topology may be found on different vehicle configurations that provide common functions.

The CAN bus 15 includes a plurality of communications links, including a first communications link 51 between controllers 10 and 20, a second link communications 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

The off-board device 45 can include a hand-held scan tool that is employed in a service bay at a vehicle diagnostic and repair center. The off-board device 45 can also include a remotely located service center. The off-board device 45 is configured to communicate with the communications device 42, including interrogating the controller 40 for messages. The off-board device 45 preferably includes a controller element, a memory element including a network topology that can be correlated to the CAN 50 and an analytical element that executes as described herein to remotely identify a fault in the CAN 50.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates that may be at either the same or at different periods for different ones of the controllers. A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers.

A communications fault leading to a lost message on the CAN bus can be the result of a fault in one of the controllers, a fault in one of the communications links of the CAN bus, a fault in one of the power links of the power grid, and a fault in one of the ground links of the ground grid. Topology graphs can be developed, including a communications topology, a power topology and a ground topology. A reachability analysis is conducted for each of the topology graphs with an open link removed. One embodiment of a reachability analysis of a topology graph is described with reference to FIG. 2.

Figure 2:
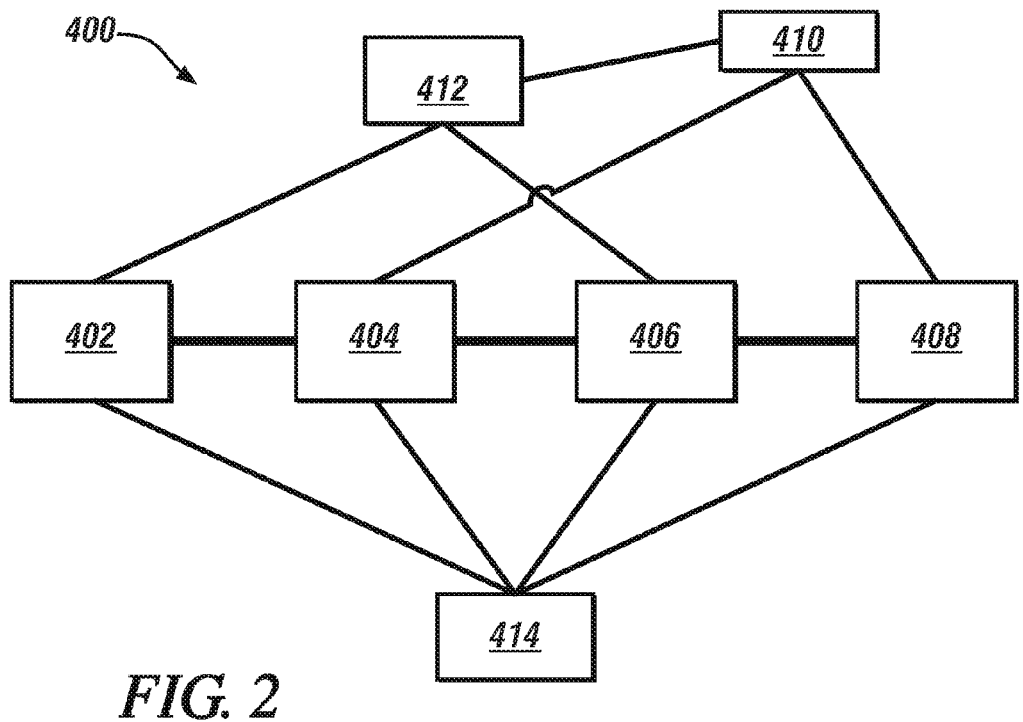
FIG. 2 illustrates an exemplary CAN including controllers, monitoring controller, power supply, battery star and ground, each connected via a link as shown in accordance with the disclosure.

FIG. 2 illustrates a network topology for an exemplary CAN 400 including controllers 402, 404 and 406, monitoring controller 408, power supply 410, battery star 412 and ground 414, each connected via a link as shown. The monitoring controller 408 observes symptoms that indicate various fault sets, with each fault set having a corresponding fault signature that includes a set of inactive controllers. The monitoring function is shown as being executed by controller 408, but it is understood that any of or all of the controllers 402, 404, 406 and 408 on the communications bus can be configured to execute a fault diagnosis since any message on the CAN bus can be observed at any of and all of the controller nodes.

A fault model is generated for the network topology and includes a plurality of symptoms observed by a monitoring controller for each of a plurality of faults and a corresponding fault signature vector $V_f^{inactive}$ that includes a set of observed inactive controllers associated therewith. An exemplary fault model associated with the network topology depicted with reference to FIG. 2 includes the following with reference to Table 1, wherein the network topology for the CAN 400 includes controllers 402 [1], 404 [2] and 406 [3], monitoring controller 408 [0], power supply 410 [4], battery star 412 [5] and ground 414 [6]. The fault model is derived employing a reachability analysis of the network topology wherein the symptom is induced and communications are monitored to determine which of the controllers is inactive for that symptom.

TABLE 1

| Fault Set | Symptom | Contents of Fault signature vector $V_f^{inactive}$ |
|---|---|---|
| f1 | Open Link [1]-[2]<br>Open Link [1]-[5]<br>Open Link [1]-[6]<br>[1]Fault | [1] |
| f2 | Open Link [2]-[4]<br>Open Link [2]-[6]<br>[2]Fault | [2] |
| f3 | Open Link [3]-[5]<br>Open Link [3]-[6]<br>[3]Fault | [3] |
| f4 | Open Link [2]-[3] | [1], [2] |
| f5 | Open Link [4]-[5] | [1], [3] |
| f6 | Open Link [1]-[2]<br>CAN bus wire short | [1], [2], [3] |

A first fault set f1 can include a symptom of an open link between one of controller 402 and battery star 412, controller 402 and ground 414, controller 402 and controller 404, and a fault with controller 402, with a corresponding fault signature vector $V_f^{inactive}$ including controller 402 as inactive. A second fault set f2 can include a symptom of an open link between one of controller 404 and battery 410, controller 404 and ground 414, and a fault with controller 404, with a corresponding fault signature vector $V_f^{inactive}$ including controller 404 as inactive. A third fault set f3 can include a symptom of an open link between one of controller 406 and battery star 412, controller 406 and ground 414, and a fault with controller 406 with a corresponding fault signature vector $V_f^{inactive}$ including controller 406 as inactive. A fourth fault set f4 can include a symptom of an open link between controller 404 and controller 406 with a corresponding fault signature vector $V_f^{inactive}$ including controllers 402 and 404 as inactive. A fifth fault set f5 can include a symptom of an open link between battery 410 and battery star 412 with a corresponding fault signature vector $V_f^{inactive}$ including controllers 402 and 406 as inactive. A sixth fault set f6 can include a symptom of an open link between monitoring controller 408 and controller 406 with a corresponding fault signature vector $V_f^{inactive}$ including controllers 402, 404 and 406 as inactive. Other fault signature vectors $V_f^{inactive}$ may be developed in accordance with a specific architecture of a CAN system employing a reachability analysis of a topology graph of the CAN. Because the monitoring function including fault diagnosis can be executed in any of or all of the controllers 402, 404, 406 and 408, suitable fault sets and symptoms can be developed to achieve fault signature vectors $V_f^{inactive}$ that isolate to a single actionable fault.

Figure 3:
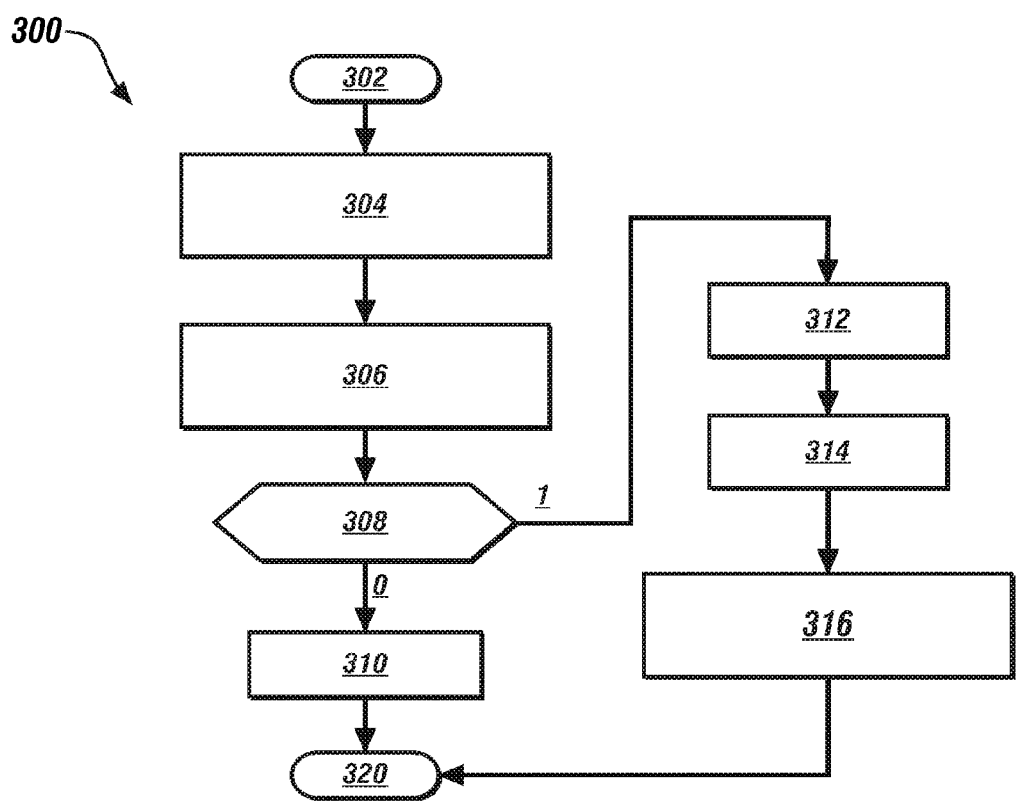
FIG. 3 illustrates an on-board CAN monitoring routine that detects inactive controllers in a CAN, in accordance with the disclosure.

FIG. 3 illustrates an on-board CAN monitoring routine 300 that executes on-board fault detection and isolation by generating a system model that includes $V_{ECU}$, which represents a set of controllers in the CAN including one or more monitoring nodes that can include one or a plurality of the controllers and/or a monitoring controller. Each of the controllers transmits a set of messages that may have different periods or repetition rates.

The on-board CAN monitoring routine 300 is executed to obtain controller-active reports based upon monitoring communications originating from the controllers in the CAN, thus detecting whether the controllers connected to the CAN bus are active or inactive. Table 2 is provided as a key to the on-board CAN monitoring routine 300 of FIG. 3, wherein the numerically labeled blocks and the corresponding functions are set forth as follows.

TABLE 2

| BLOCK | BLOCK CONTENTS |
|---|---|
| 302 | Start |
| 304 | Perform controller active/inactive detection |
| 306 | Perform data filtering to remove noise in controller active/inactive detection |
| 308 | Is there inactive controller(s)? |
| 310 | Fault_Num = 0 |
| 312 | Increment Fault_Num<br>Fault_Num = Fault_Num + 1 |
| 314 | R_Inactive[Fault_Num] = set of inactive controllers |
| 316 | Record fault information<br>Time_Stamp, Fault_Num, R_Inactive[k], k = 1, . . . , Fault_Num |
| 320 | End |

The CAN monitoring routine 300 is periodically executed during vehicle operation, e.g., each 100 ms. Upon starting (302), the monitoring controller executes to detect which of the controllers on the CAN bus is active and thus which of the controllers on the CAN bus is inactive (304). This active/inactive detection can take any form, and preferably includes some form of monitoring and detecting whether communications originating from each of the controllers has occurred within a predetermined time period associated with operation of the respective controller, and identifying as inactive those controllers that have not generated a message. The active/inactive detection results are subjected to data filtering to remove data noise (306), and the results are evaluated to determine if any of the controllers are inactive (308). If no controllers are inactive (308)(0), the variable Fault_Num is set equal to zero (310), and this iteration of the routine 300 ends (320). The variable Fault_Num is used to indicate the number of faults occurred and initially it is zero. If any of the controllers is inactive (308)(1), the variable Fault_Num is incremented (312). For each fault indexed by the variable Fault_Num, the set of inactive controllers after data filtering is stored by R_Inactive[Fault_Num] and the recorded inactive controllers R_Inactive[Fault_Num] is set equal to the set of inactive controllers (314).

Associated fault information is captured, including a time stamp, fault number, and the set of inactive controllers for each of the fault numbers R_Inactive[k], k=1, . . . , Fault_Num (316). Thus, each fault record includes: (Time_stamp, Fault_Num, R_Inactive[k], k=1, . . . , Fault_Num), wherein Fault_Num is the total number of faults occurred in this record and R_Inactive[k] is the set of inactive controllers for each fault indexed by k. This iteration of the routine 300 ends (320).

Figure 4:
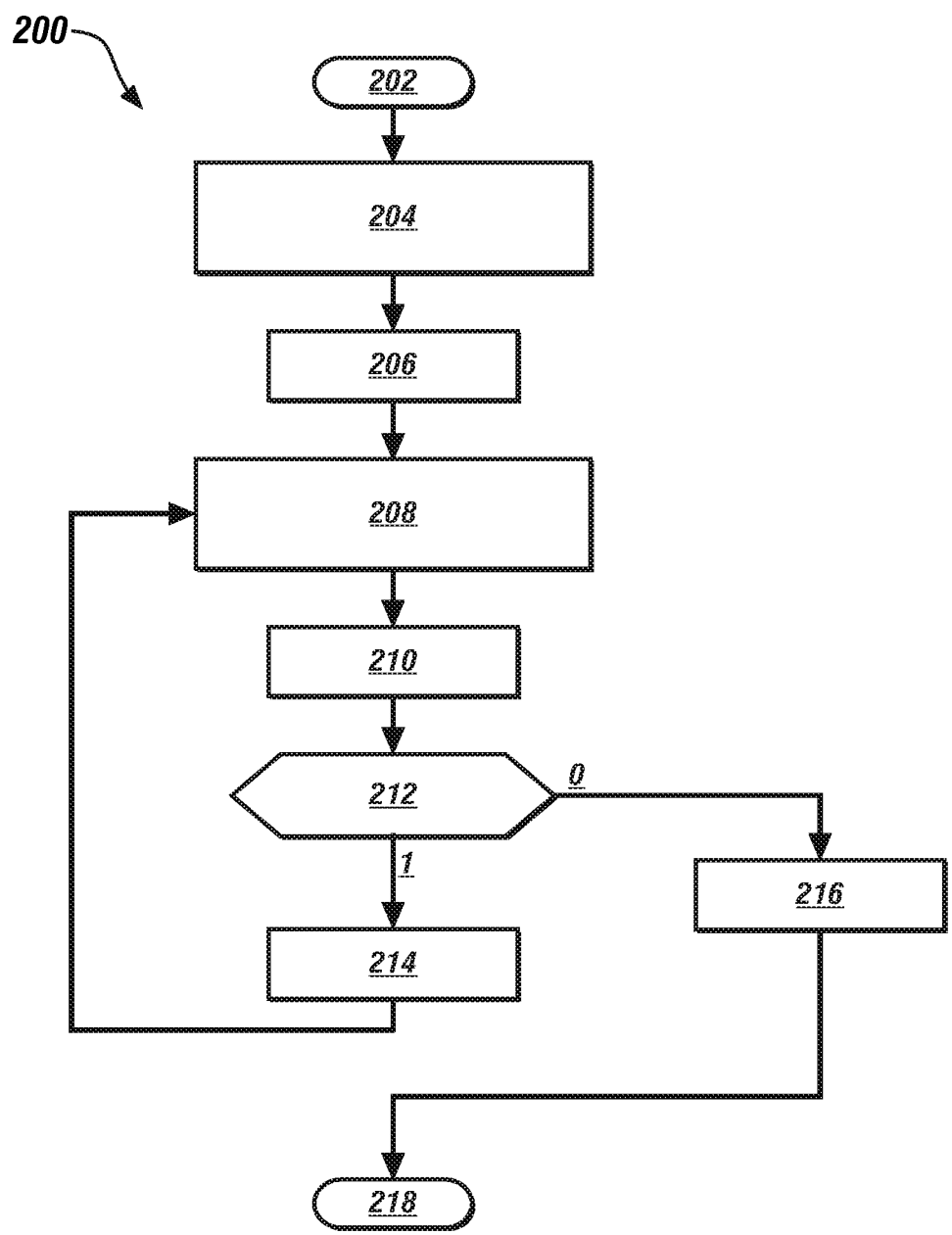
FIG. 4 illustrates an off-board fault isolation routine to determine fault candidates, i.e., open links, wire shorts, or faulty controllers employing fault signature vectors, in accordance with the disclosure.

FIG. 4 illustrates an off-board fault isolation routine 200 to determine fault candidates, i.e., open links, wire shorts, or faulty controllers employing fault signature vectors $V_f^{inactive}$, examples of which are described with reference to FIG. 2. Topology graphs, e.g., as shown with reference to FIG. 2 include topologies $G_{bus}$, $G_{bat}$, and $G_{gnd}$ of the communications bus, the power bus and the ground bus, respectively. A fault set F can include each controller node fault, each bus link open fault, each power link open fault, each ground link open fault and other faults for the topology graphs. A pre-operation exercise generates a fault signature vector $V_f^{inactive}$ composed of a set of inactive controllers for each fault f in the fault set F, e.g., as described with reference to FIG. 2 and Table 1 hereinabove. The fault signature vector $V_f^{inactive}$ is employed by the off-board fault isolation routine 200 to isolate a fault.

Table 3 is provided as a key to the off-board fault isolation routine 200 of FIG. 4, wherein the numerically labeled blocks and the corresponding functions are set forth as follows.

TABLE 3

| BLOCK | BLOCK CONTENTS |
|---|---|
| 202 | Initialize |
| 204 | Obtain fault information from on-board controller Time_Stamp, Fault_Num, R_Inactive[k], k = 1, . . . , Fault_Num |
| 206 | k = 1 |
| 208 | FC = {S ⊆ F: |S| ≥ k and it is the smallest such that R_Inactive[k] = ($\cup_{f \in S} V_f^{inactive}$), and if k > 1 then ∀ R ∈ Pre_FC, R ⊆ S} |
| 210 | Pre_FC = FC |
| 212 | k < Fault_Num? |
| 214 | k = k + 1 |
| 216 | Output FC as the set of fault candidates |
| 218 | End |

The off-board fault isolation routine 200 executes in response to an interrogatory message that originates from an off-board service device employing a direct hard-wire connection and/or a wireless telematics connection, an embodiment of which is described with reference to FIG. 1. The off-board service device includes data in the form of a system topology that includes the fault signature vector $V_f^{inactive}$ for each fault f indicating the set of inactive controllers associated therewith.

During each execution of the off-board fault isolation routine 200, terms are initialized (202), including ensuring that a fault candidate register FC and a fault candidate register from a previous iteration pre_FC are empty. Fault information in the form of fault records is retrieved from the on-board controller (204). Each fault record includes: Time_stamp, Fault_Num, R_Inactive[k], k=1, . . . , Fault_Num), wherein Fault_Num is the total number of faults occurring in this record and R_Inactive[k] is the set of inactive controllers for each fault indexed by k. The index k is initialized to a value of "1" (206). The routine determines for each fault index k, a fault candidate FC as a subset S of F such that S is the smallest (measured by size) among the sets with |S|≥k that satisfies the following relationships.

$$R\_Inactive[k] = (\cup_{f \in S} V_f^{inactive}),$$

and if k>1, then ∀R∈Pre_FC, R⊆S

The fault candidate from the previous iteration pre_FC is included in the present FC set so that any candidate of the previous fault becomes a part of the current fault candidate set FC (210), and if the index k is less than the quantity of faults Fault_Num (212)(1), the index k is incremented and the next set of fault candidates is evaluated (208). When all of the faults have been evaluated (212)(0), the fault candidate set FC is output as the set of fault candidates (216) and execution of the off-board fault isolation routine 200 ends (218).

CAN systems are employed to effect signal communications between controllers in a system, e.g., a vehicle. The fault isolation process described herein permits location and isolation of a single fault, multiple faults, and intermittent faults in the CAN systems, including faults in a communications bus, a power supply and an electrical ground employing the system topology that includes the fault signature vector $V_f^{inactive}$ for each fault f indicating the set of inactive controllers associated therewith.

In one embodiment, several of the controllers can be employed as monitoring controllers to execute an embodiment of the on-board CAN monitoring routine 300, with results identifying inactive nodes communicated to an embodiment of the off-board fault isolation routine 200 for identifying fault candidates by employing network topologies that are specific to the selected monitoring controllers and having differing fault signatures and symptoms for the different monitoring controllers. Such an arrangement allows the system to further isolate location of a CAN fault by comparing results from the executions of the off-board fault isolation routine 200.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a controller area network (CAN) on a mobile system including a plurality of CAN elements comprising a communication bus and a plurality of nodes, comprising:
    detecting inactive nodes of the CAN;
    employing an off-board controller to identify a candidate fault in the CAN based upon the inactive nodes of the CAN and a network topology for the CAN; and
    isolating a fault in the CAN based upon the candidate fault.

2. The method of claim 1, wherein employing the off-board controller to identify a candidate fault in the CAN comprises:
    comparing the inactive nodes of the CAN with a plurality of fault signature vectors associated with the network topology for the CAN;
    identifying one of the fault signature vectors that correspond to the inactive node of the CAN;
    determining a fault symptom associated with the identified fault signature vector; and
    identifying the candidate fault in the CAN based upon the fault symptom.

3. The method of claim 2, wherein determining the fault symptom associated with the identified fault signature vector comprises employing a reachability analysis of the network topology of the CAN wherein communications are monitored to determine which of the nodes is inactive for the fault symptom.

4. The method of claim 2, wherein a fault symptom associated with the identified fault signature vector comprises an open link between a power supply and a node.

5. The method of claim 2, wherein a fault symptom associated with the identified fault signature vector comprises an open link between an electrical ground and a node.

6. The method of claim 2, wherein a fault symptom associated with the identified fault signature vector comprises an open communications link between a first node and a second node.

7. The method of claim 2, wherein a fault symptom associated with the identified fault signature vector comprises a fault in a node.

8. The method of claim 2, wherein a fault symptom associated with the identified fault signature vector comprises a short in a communications link between a first node and a second node.

9. The method of claim 1, wherein detecting inactive nodes of the CAN comprises employing an on-board controller to monitor communications from the nodes of the CAN and identifying as inactive any node of the CAN that fails to generate a message on the CAN within a predetermined period of time.

10. The method of claim 1, further comprising:
  employing an on-board monitoring routine to detect the inactive nodes of the CAN and capture a corresponding time stamp; and
  in response to a query, communicating the inactive nodes of the CAN and the corresponding time stamp to the off-board controller.

11. Method for monitoring a controller area network (CAN) on a mobile system including a plurality of CAN elements comprising a plurality of controllers signally connected to a communication bus, comprising:
  employing an on-board monitoring routine to identify each of the controllers of the CAN as either active or inactive;
  in response to a query, communicating the identified active and inactive controllers of the CAN to an off-board controller;
  employing the off-board controller to identify a candidate fault in the CAN based upon the inactive controllers of the CAN and a network topology for the CAN; and
  isolating a specific fault in the CAN based upon the candidate fault.

12. The method of claim 11, wherein employing the off-board controller to identify a candidate fault in the CAN comprises:
  comparing the inactive controllers of the CAN with a plurality of fault signature vectors associated with the network topology for the CAN;
  identifying one of the fault signature vectors that correspond to the inactive controller of the CAN;
  determining a fault symptom associated with the identified fault signature vector; and
  identifying the candidate fault in the CAN based upon the fault symptom.

13. The method of claim 12, wherein determining the fault symptom associated with the identified fault signature vector comprises employing a reachability analysis of the network topology of the CAN wherein communications are monitored to determine which of the controllers is inactive for the fault symptom.

14. The method of claim 12, wherein a fault symptom associated with the identified fault signature vector comprises an open link between a power supply and a controller.

15. The method of claim 12, wherein a fault symptom associated with the identified fault signature vector comprises an open link between an electrical ground and a controller.

16. The method of claim 12, wherein a fault symptom associated with the identified fault signature vector comprises an open communications link between a first controller and a second controller.

17. The method of claim 12, wherein a fault symptom associated with the identified fault signature vector comprises a fault in a controller.

18. The method of claim 12, wherein a fault symptom associated with the identified fault signature vector comprises a short in a communications link between a first controller and a second controller.

19. The method of claim 11, wherein identifying each of the controllers of the CAN as either active or inactive comprises employing an on-board controller to monitor communications from the controllers of the CAN and identifying as inactive any controller of the CAN that fails to generate a message on the CAN within a predetermined period of time.

* * * * *